US008482038B2

(12) United States Patent
Sasaki et al.

(10) Patent No.: US 8,482,038 B2
(45) **Date of Patent: *Jul. 9, 2013**

(54) SEMICONDUCTOR DEVICE

(75) Inventors: Takayuki Sasaki, Tokyo (JP); Yasuto Igarashi, Tokyo (JP); Naozumi Morino, Tokyo (JP)

(73) Assignee: Renesas Electronics Corporation, Kawasaki-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/545,553

(22) Filed: Jul. 10, 2012

(65) Prior Publication Data

US 2012/0280741 A1 Nov. 8, 2012

Related U.S. Application Data

(63) Continuation of application No. 11/651,076, filed on Jan. 9, 2007, now Pat. No. 8,242,541.

(30) Foreign Application Priority Data

Mar. 3, 2006 (JP) .................................. 2006-57146

(51) Int. Cl.
*H01L 27/118* (2006.01)

(52) U.S. Cl.
USPC .............. 257/210; 257/202; 257/203; 326/62

(58) Field of Classification Search
None
See application file for complete search history.

(56) References Cited

U.S. PATENT DOCUMENTS

| | | | |
|---|---|---|---|
| 5,401,989 | A | 3/1995 | Kikuchi |
| 5,680,364 | A | 10/1997 | Lee |
| 6,683,767 | B2 | 1/2004 | Ito et al. |
| 2001/0035555 | A1 | 11/2001 | Nonaka |
| 2003/0178706 | A1 | 9/2003 | Eshima et al. |
| 2004/0121732 | A1 | 6/2004 | Kerth et al. |
| 2004/0172605 | A1 | 9/2004 | Kuge et al. |

FOREIGN PATENT DOCUMENTS

| | | |
|---|---|---|
| JP | 06-21331 | 1/1994 |
| JP | 06-84915 | 3/1994 |
| JP | 2002-83872 A | 3/2002 |
| JP | 2002-299340 A | 10/2002 |
| JP | 2003-273231 A | 9/2003 |

OTHER PUBLICATIONS

Office Action from Japanese Patent Application No. 2006-057146 dated Apr. 10, 2012 (and English translation).

*Primary Examiner* — Steven Loke
*Assistant Examiner* — Cuong Nguyen
(74) *Attorney, Agent, or Firm* — Miles & Stockbridge P.C.

(57) ABSTRACT

A technique which reduces the influence of external noise such as crosstalk noise in a semiconductor device to prevent a circuit from malfunctioning. A true signal wire and a bar signal wire which are susceptible to noise and part of an input signal line to a level shifter circuit, and shield wires for shielding these signal wires are laid on an I/O cell. Such I/O cells are placed side by side to complete a true signal wire connection and a bar signal wire connection. These wires are arranged in a way to pass over a plurality of I/O cells and are parallel to each other or multilayered.

8 Claims, 8 Drawing Sheets

VCC2(3.3V)
LEVEL SHIFTER CELL
VCC2
VCC2
VCC2
VSS
VSS
VSS
A2
VCC2(3.3V)
VSS(0V)
102
Bar
True
VCC1(2.5V)
T/B BUFFER CELL
VCC1(2.5V)
VSS(0V)
VCC1
VCC1
VSS
VSS
A1
101

DETAILS

SECTIONAL VIEW

401
TRUE/BAR SIGNAL INPUT
LEVEL SHIFTER CELL
102
306a
305
306b
304a
303
304b
302
301
TRUE/BAR SIGNAL OUTPUT
T/B BUFFER CELL
101
401

DETAILS

SECTIONAL VIEW

SEMICONDUCTOR DEVICE

CROSS-REFERENCE TO RELATED APPLICATIONS

This application is a continuation of application Ser. No. 11/651,076 filed Jan. 9, 2007 now U.S. Pat. No. 8,242,541. The present application also claims priority from Japanese patent application No. 2006-57146 filed on Mar. 3, 2006, the content of which is also hereby incorporated by reference into this application.

BACKGROUND OF THE INVENTION

The present invention relates to a semiconductor device and more particularly to a technique which is useful for the I/O cell architecture and layout method of the same.

In this connection, the present inventors examined the semiconductor device technique described below.

Regarding I/O (input/output circuit) areas of an LSI (large-scale integrated circuit), in transmitting signals between areas with different voltages, particularly from an I/O area with a low voltage to an I/O area with a high voltage, it is necessary to shift up the signal level.

Moreover, in this case, layout of the level-up circuit requires high noise sensitivity in wiring for generating signals.

In shifting up the level of a signal through transmission from an I/O area with a low voltage to an I/O area with a high voltage, a true/bar (normal/inverted) signal is generated in a power supply area (area with a low voltage) before shifting up the level. This signal is automatically routed to an I/O area with a high voltage which includes a level shifter circuit, using an ordinary P&R (placement and routing) tool to generate a signal whose level is shifted up.

In this process, in order to reduce the influence of crosstalk noise or the like, pin arrangement must be made so that I/O power supply areas which need level shift-up are close to each other to shorten the length of wiring for true and bar signals.

One example of a technique related to a semiconductor device according to the present invention is a technique described in Japanese Unexamined Patent Publication No.2003-273231. In this technique, shield wires are laid on a boundary of a macro module (analog, etc) inside an LSI core in a way to surround the core area. The shield wires are electrically connected to power wires of another interconnection layer through a power supply terminal or power supply wires of the macro module or the like to fix the electric potential of the shield wires. Then the influence of crosstalk noise or the capacitance generated between wires is estimated to know the accurate value of delay. In the LSI layout process, floorplanning is first done and power wires are arranged (I/O cell layout) before shield wires are formed.

SUMMARY OF THE INVENTION

The present inventors examined the above semiconductor device technique and have found the following problem.

For example, if power supply areas which need level shift-up for the purpose of LSI floorplanning or LSI packaging lie from one end of the chip to the other end, in some cases long true and bar signal wires are required to generate a higher level signal. Here, if automatic routing should be done using a P&R tool as usual, true and bar signals might be affected by crosstalk noise or the like, resulting in malfunctioning of the level shifter circuit to which the true and bar signals are connected.

In view of the above circumstances, an object of the present invention is to provide a technique which reduces the influence of external noise such as crosstalk noise to prevent a circuit from malfunctioning.

The above and further objects and novel features of the invention will more fully appear from the following detailed description in this specification and the accompanying drawings.

Preferred embodiments of the invention which will be disclosed herein are briefly outlined below.

In a semiconductor device according to the present invention, a first signal wire susceptible to noise and a first shield wire which shields it are laid on an I/O cell and such I/O cells are placed side by side to complete a first signal wire connection.

When signal wires are true and bar signal wires, a first and a second shield wire are laid in parallel with the true signal wire (first signal wire) and the bar signal wire (second signal wire) respectively.

The effect brought about by preferred embodiments of the invention is briefly described as follows.

Firstly, since signals susceptible to noise such as true and bar signals are shielded, the influence of external noise such as crosstalk noise is reduced, thereby preventing a circuit from malfunctioning.

Secondly, since true and bar signals go through I/O areas, the true and bar signal wires are equal in terms of length and a signal timing lag does not occur even in long-distance wiring.

DETAILED DESCRIPTION OF THE PREFERRED EMBODIMENTS

Figure 1:
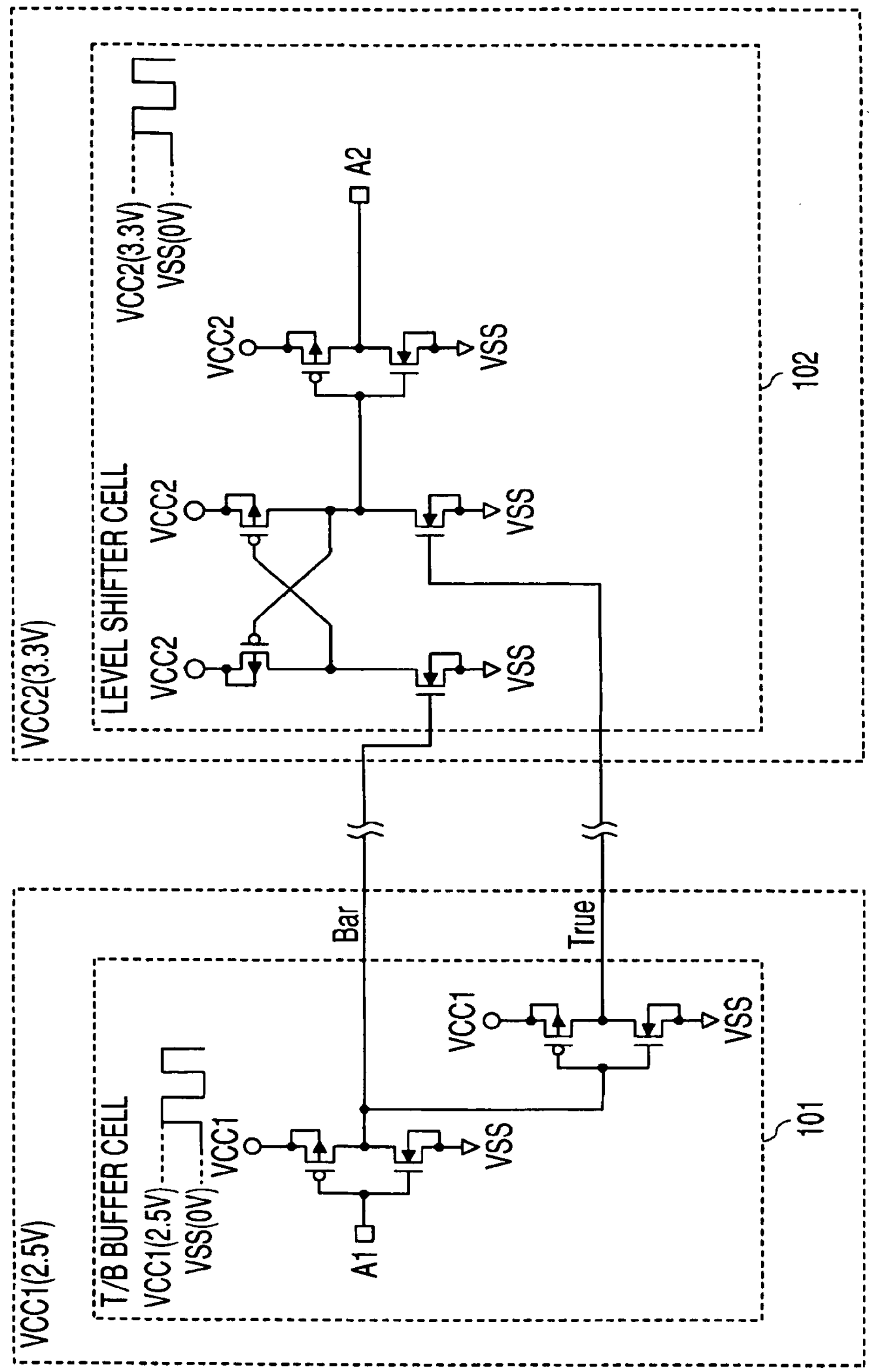
FIG. 1 is a circuit diagram showing a level shifter circuit which increases the voltage of a signal in an I/O power supply area VCC1 (2.5 V) to the voltage of an I/O power supply area VCC2 (3.3 V) in the prior art of the present invention and a first and a second embodiment of the present invention.

Next, preferred embodiments of the present invention will be described in detail referring to the accompanying drawings. In all the drawings that illustrate the preferred embodiments, elements with like functions are designated by like reference numerals and repeated descriptions of such elements are omitted.

For easier understanding of the features of the present invention, comparison with the prior art thereof is made below.

Prior Art of the Invention

FIG. 1 is a circuit diagram showing a level shifter circuit which increases the voltage of a signal in an I/O power supply area VCC1 (2.5 V) to the voltage of an I/O power supply area VCC2 (3.3 V) in the prior art of the present invention and a first and a second embodiment of the present invention.

The circuit shown in FIG. 1 is a voltage level shifter circuit which converts a signal A1 in the I/O power supply area VCC1 (2.5V) into a signal A2 in the I/O power supply area VCC2 (3.3V) away from it. It includes a T/B buffer cell 101 in the I/O power supply area VCC1 and a level shifter cell 102 in the I/O power supply area VCC2. A true signal and a bar signal (inverted signal of the true signal) are sent from the T/B buffer cell 101 to the level shifter cell 102. The signal wires for the true signal and the bar signal may be long depending on the positional relationship between the I/O power supply areas VCC1 and VCC2.

Figure 2A:
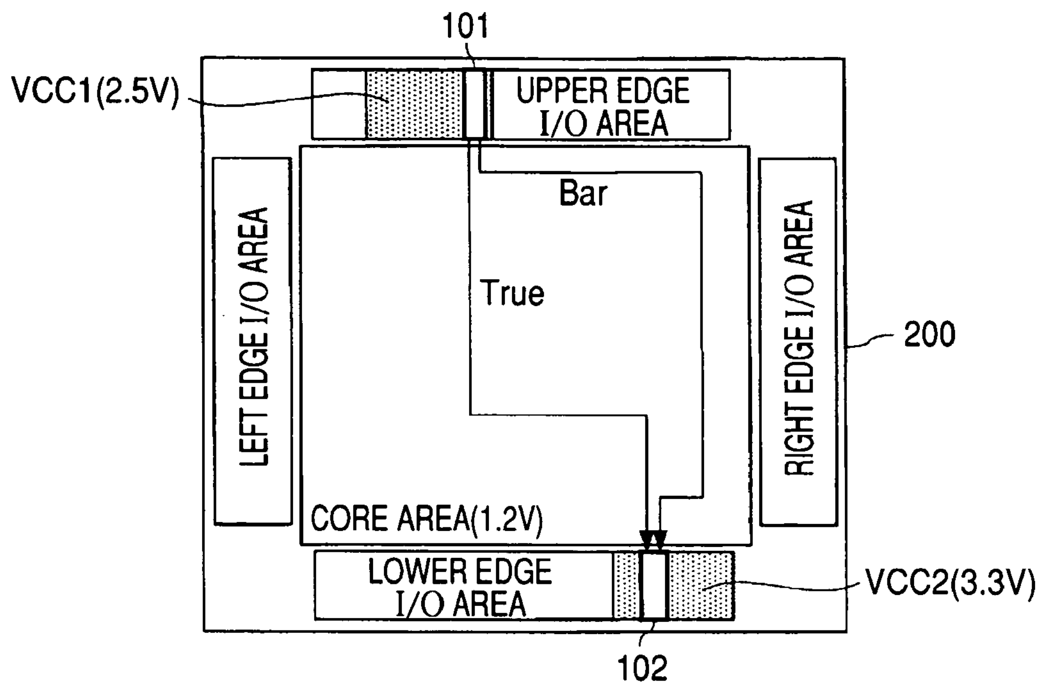
FIG. 2(*a*) shows an example of wiring for true and bar signals in the prior art of the present invention and FIG. 2(*b*) shows another example of wiring for true and bar signals.
Figure 2B:
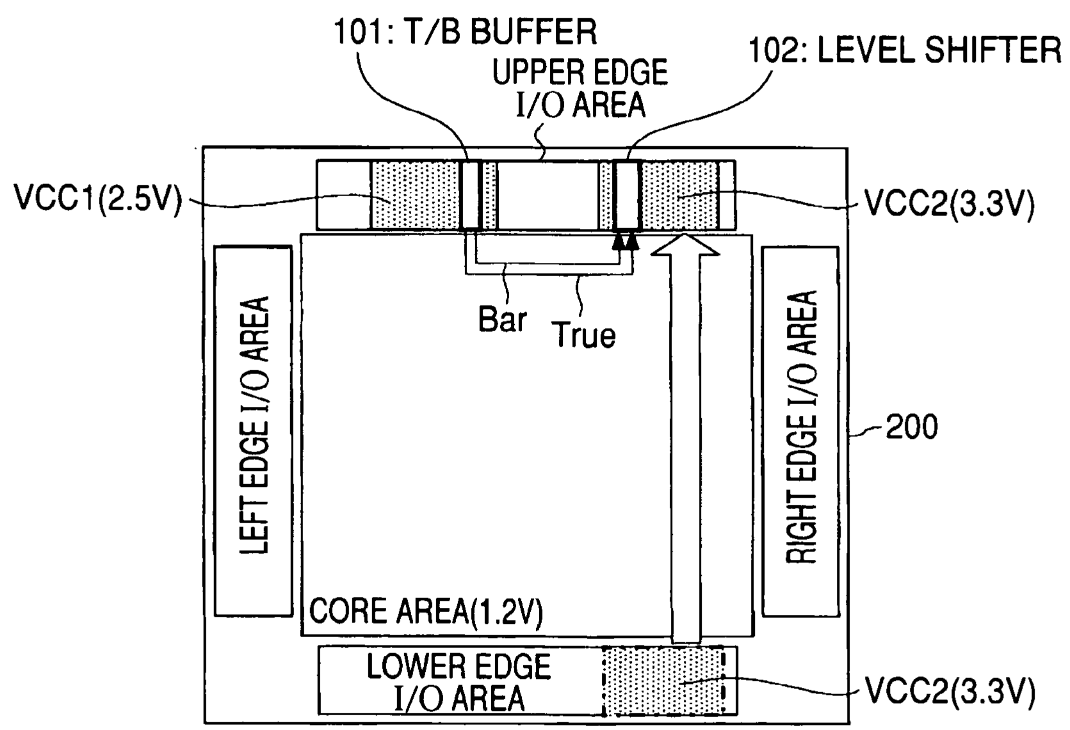

FIG. 2(*a*) shows an example of wiring for true and bar signals. FIGS. 2(*a*) and 2(*b*) schematically show a layout concerning long-distance wiring between I/O areas which is made by automatic routing.

In an LSI 200, if the I/O power supply area VCC1 (2.5V) and the I/O power supply area VCC2 (3.3V) are away from each other as shown in FIG. 2(*a*), conventionally a true or bar signal sent from the T/B buffer cell 101 (FIG. 1) has been automatically routed using a P&R tool. In this conventional method, since long-distance wiring between the I/O areas is made by automatic routing inside the core area, there is concern about an influence of noise which might be caused by a signal from the wiring in the core area.

FIG. 2(*b*) shows pin arrangement in which I/O power supply areas which need level shift-up are so close to each other as to shorten the length of wiring for true and bar signals in order to reduce the influence of noise or the like. However, even with such a layout, it is impossible to avoid the influence of noise from the wiring inside the core area.

First Embodiment

Figure 3B:
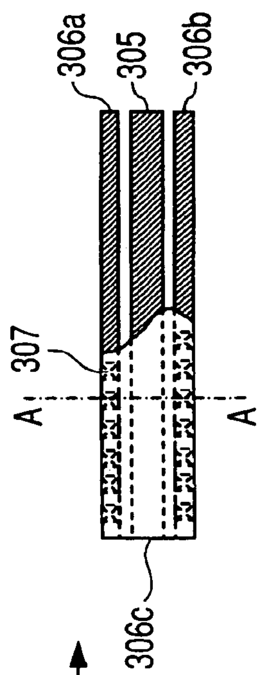
FIGS. 3(*a*) to 3(*c*) show the arrangement of signal wires and shield wires in an I/O cell in a semiconductor device according to a first embodiment of the present invention, in which FIG. 3(*a*) is a top view, FIG. 3(*b*) is a detail view and FIG. 3(*c*) is a sectional view.
Figure 3C:
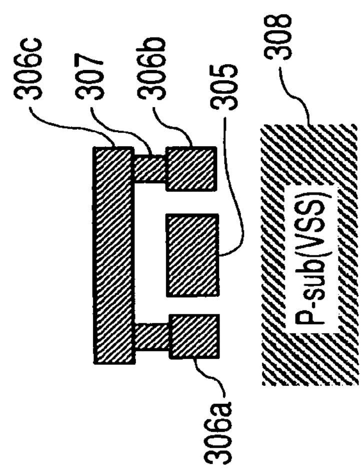
Figure 3A:
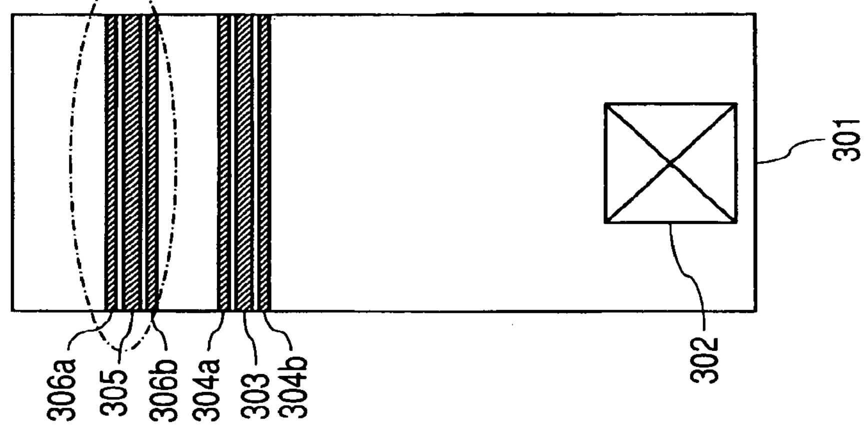
Figure 4:
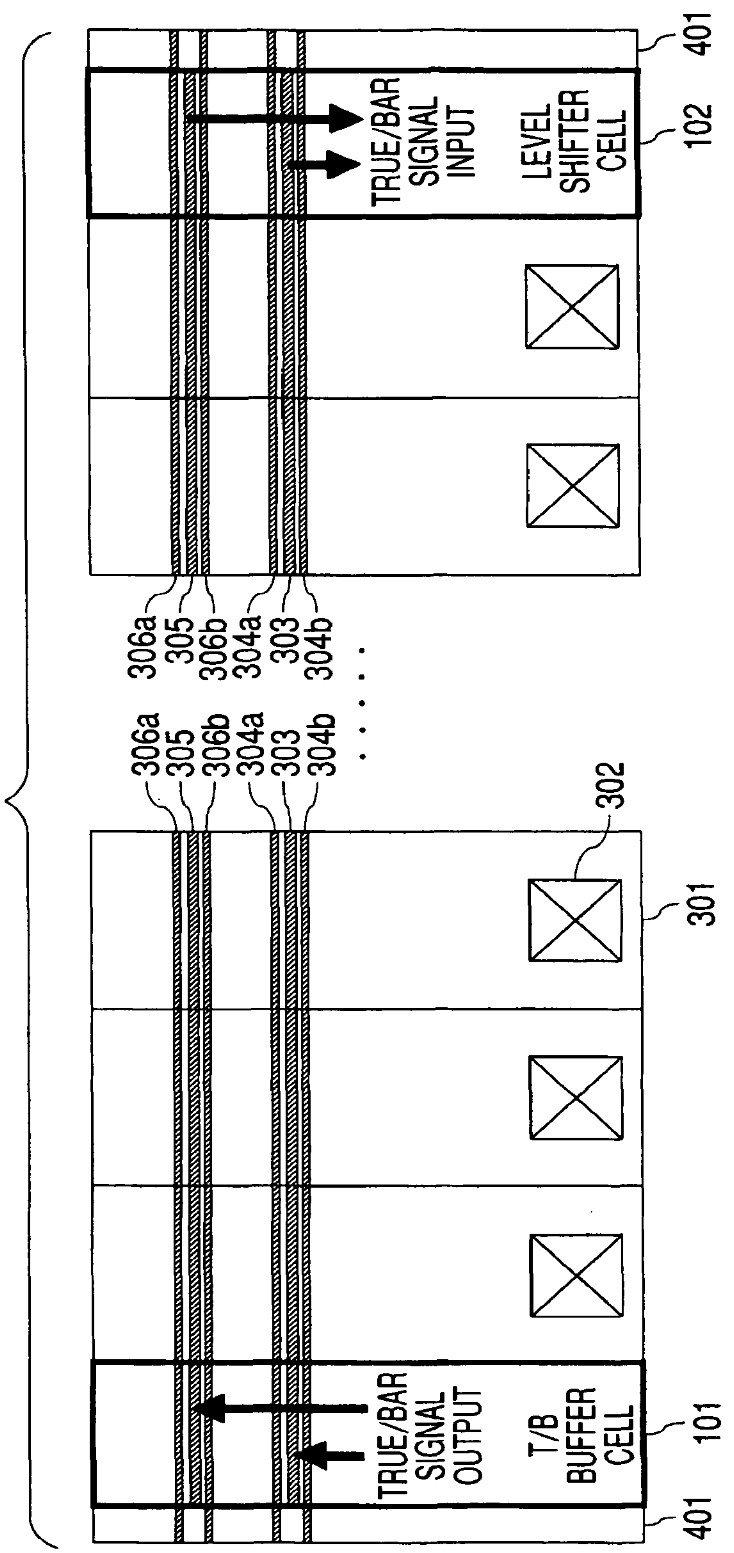
FIG. 4 schematically shows signal wires and shield wires with I/O cells in place in the semiconductor device according to the first embodiment of the invention.
Figure 5:
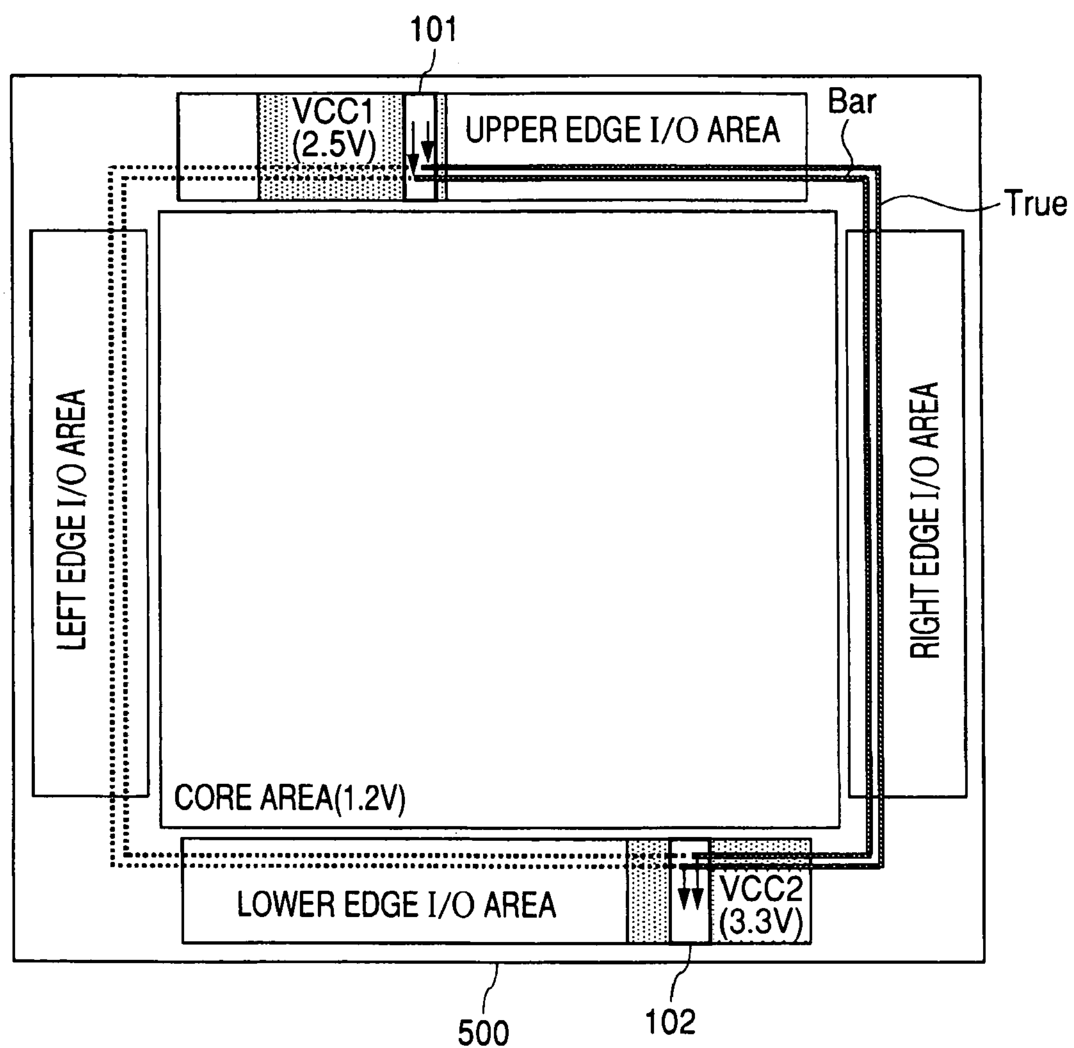
FIG. 5 schematically shows long-distance wiring with first layer metal shield wires in the semiconductor device according to the first embodiment of the invention.
Figure 6B:
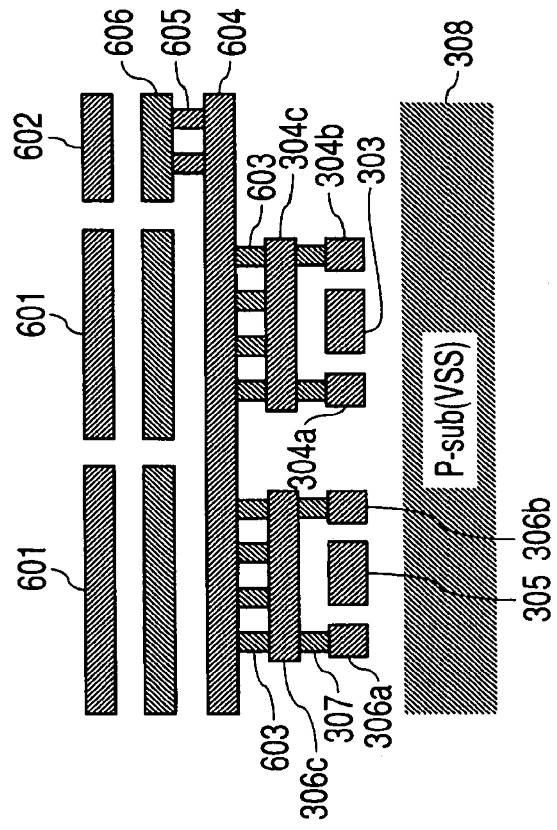
FIGS. 6(*a*) and 6(*b*) show the arrangement of signal wires and shield wires in an I/O cell and surrounding power wires in the semiconductor device according to the first embodiment of the invention, in which FIG. 6(*a*) is a top view and FIG. 6(*b*) is a sectional view.
Figure 6A:
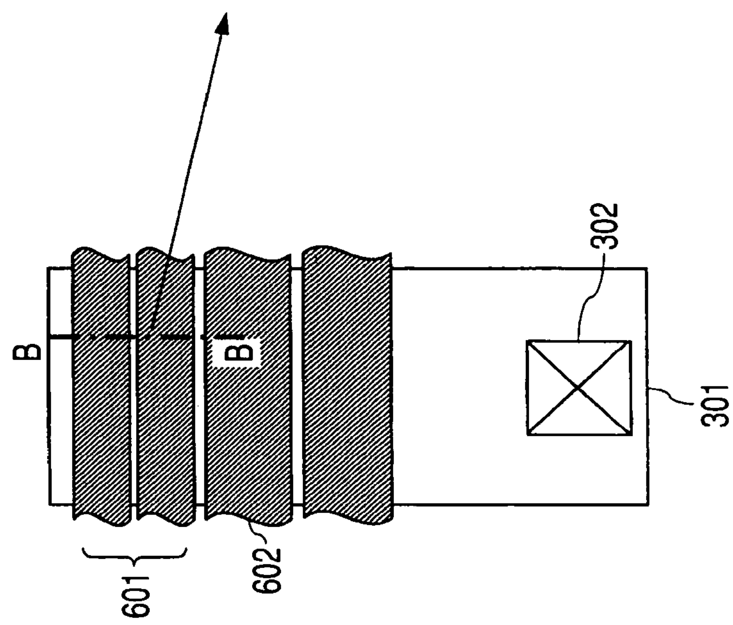
Figure 7:
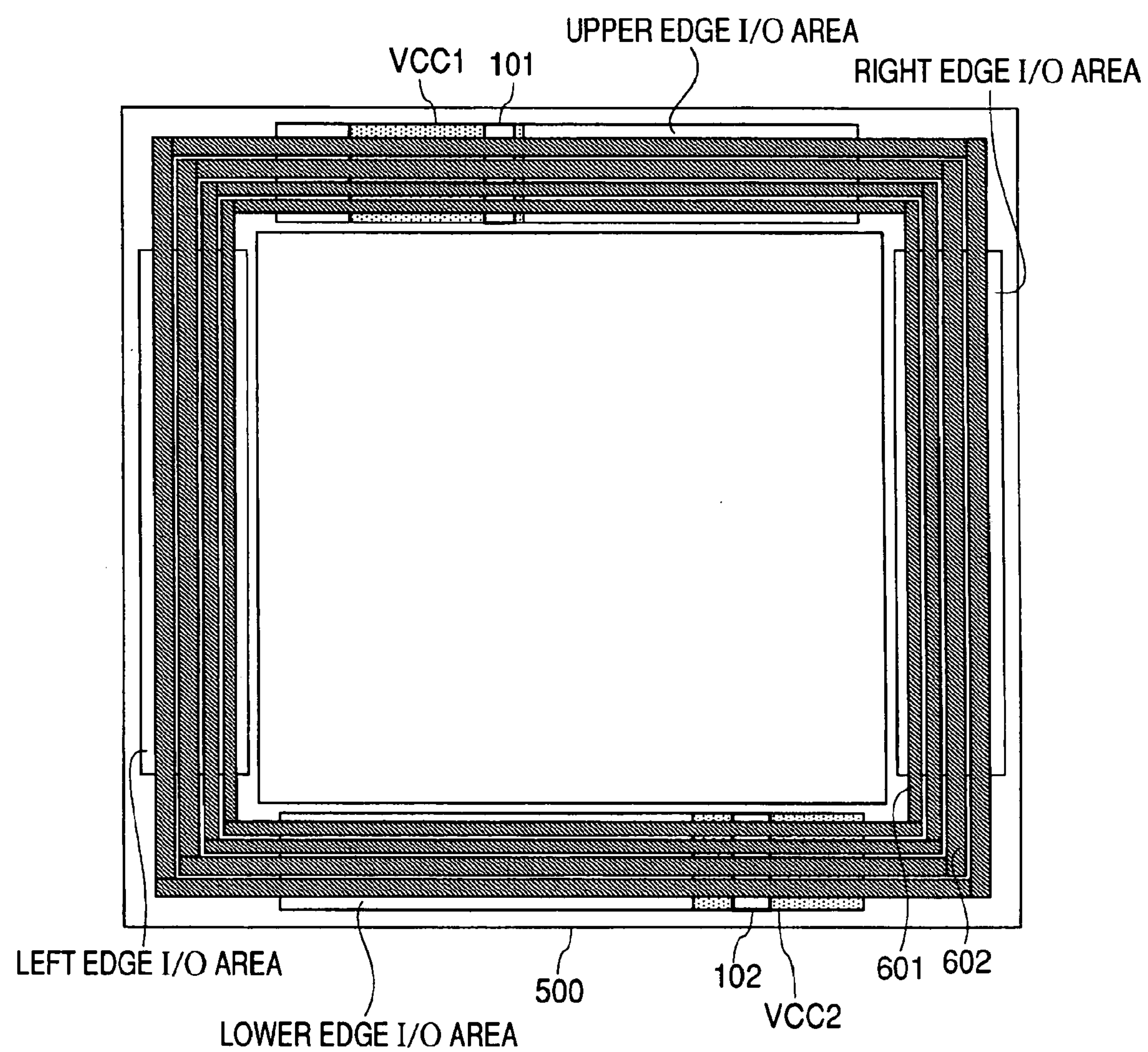
FIG. 7 schematically shows surrounding power wires over the shield wires in the semiconductor device according to the first embodiment of the invention.

FIGS. 3(*a*) to 3(*c*) show the arrangement of signal wires and shield wires in an I/O cell in a semiconductor device according to the first embodiment of the present invention; FIG. 4 schematically shows signal wires and shield wires with I/O cells in place; FIG. 5 schematically shows long-distance wiring with first layer metal (metal 1) shield wires; FIGS. 6(*a*) and 6(*b*) show the arrangement of signal wires and shield wires in an I/O cell and surrounding power wires; and FIG. 7 schematically shows surrounding power wires over the first layer metal (metal 1) shield wires.

First, the arrangement of shield wires in an I/O cell 301 in the first embodiment will be explained referring to FIGS. 3(*a*) to 3(*c*). FIG. 3(*a*) is a top view of the I/O cell. As shown in FIG. 3(*a*), the I/O cell 301 has a bonding pad 302, a true signal wire 303, shield wires for it, 304*a*, 304*b* and a bar signal wire 305 and shield wires for it, 306*a*, 306*b*. The true signal and bar signal (inverted signal of the true signal) wires are part of the signal input line from the T/B buffer cell 101 to the level shifter cell 102.

The true signal wire 303, bar signal wire 305 and shield wires 304*a*, 304*b*, 306*a*, 306*b* are arranged in a way to pass over plural I/O cells. The true signal wire 303, bar signal wire 305 and shield wires 304*a*, 304*b*, 306*a*, 306*b* are formed in the first layer metal.

Since the true signal wire 303 and bar signal wire 305 are signal wires between different power supply areas, a buffer to which power is supplied from another power source cannot be inserted midway along the wires.

FIG. 3(*b*) shows details of the bar signal wire 305 and the shield wires for it, 306*a* and 306*b*. The shield wires 306*a* and 306*b* are connected to a shield wire 306*c* of the second layer metal (metal 2) through first layer via holes (via 1) 307.

FIG. 3(*c*) is a sectional view taken along the line A-A of FIG. 3(*b*). A p-type substrate (P-sub) 308 lies under the bar signal wire 305 and the shield wires for it, 306*a* and 306*b*. The shield wires 306*a*, 306*b* and 306*c* and the first layer via holes 307 and the P-type substrate 308 have the same electric potential (substrate potential VSS). In other words, the bar signal wire 305 is surrounded and shielded by the shield wires 306*a*, 306*b*, 306*c*, the first layer via holes 307 and the p-type substrate 308.

The true signal wire 303 is shielded in the same manner as the bar signal wire 305. The positions of the true signal wire 303 and bar signal wire 305 are not limited to those in this embodiment; they may be interchanged. Furthermore, it is also possible to use three or more signal wires.

As shown in FIG. 4, surrounding shield wires are laid in all I/O cells in use and true and bar signals as output of the T/B buffer cell 101 are connected to the first layer metal surrounded by the shield wires. Also, the true and bar signals are connected to the level shifter cell 102 as the destination through the shield wires.

Since all I/O cells in use have shield wires in this way, true and bar signals are routed by placement of the I/O cells. True and bar signals are routed in the I/O areas without going through the core area and the shield wires reduce the influence of noise.

I/O cells (fill cells) other than I/O cells 301 having true and bar signal wires which connect the T/B buffer cell 101 and the level shifter cell 102 need not have true and bar signal wires. More specifically, shield cut cells 401 are prepared in order to reduce the parasitic capacitance or parasitic resistance of signal wires. A shield cut cell 401 which breaks connection between I/O cells is located at each end of the signal wires to reduce undesirable parasitic capacitance or parasitic resistance of the wires. As mentioned above, this embodiment uses two types of I/O cells: I/O cells 301 having true and bar signal wires and shields wires for the true and bar signal wires, and I/O cells (shield cut cells 401) having no true and bar signal wires.

FIG. 5 shows long-distance wiring with first layer metal (metal 1) shield wires inside an LSI 500. True and bar signal wires from the T/B buffer cell 101 in the I/O power supply area VCC1 (2.5 V) go through an upper edge I/O area, a right edge I/O area and a lower edge I/O area in a manner to surround the core area and finally enter the level shifter cell 102 in the I/O power supply area VCC2 (3.3 V). This arrangement is particularly effective when the true and bar signal wires are longer than each edge of the LSI 500 as shown in FIG. 5.

FIGS. 6(*a*) and 6(*b*) show the arrangement of signal wires and shield wires with surrounding power wires over them. FIG. 6(*a*) is a top view of an I/O cell. As shown in FIG. 6(*a*), surrounding power wires 601 and 602, which are thicker than the true and bar signal wires, lie in a layer over the true and bar signal wires and shied wires.

FIG. 6(*b*) is a sectional view taken along the line B-B of FIG. 6(*a*). As shown in FIG. 6(*b*), the shield wires 304*a*, 304*b*,

304*c*, 306*a*, 306*b* and 306*c* are connected to third layer metal (metal 3) 604 through second layer via holes (via 2) 603 and to fourth layer metal (metal 4) through third layer via holes (via 3) 605. These wires have the same electric potential (substrate potential VSS). There are surrounding power wires 601 and 602 of fifth layer metal (metal 5) over the fourth layer metal (metal 4) 606.

FIG. 7 is an overall view of an LSI with surrounding power wires. As shown in FIG. 7, the surrounding power wires 601 and 602 lie over the shield wires in the I/O areas.

Therefore, in the semiconductor device according to the first embodiment, all the long-distance wires are covered by shield wires, eliminating an influence of external noise. In addition, since true and bar signals go through the I/O areas , the true and bar signal wires are equal in terms of length and also have equal parasitic capacitance or parasitic resistance and thus a signal timing lag does not occur.

In addition, since signal wire connections are completed simply by placement of I/O cells, automatic routing is not needed for connection between cells, which makes wiring design easy. The reason is as follows. In the technique described as the prior art whereby shield wires are formed after arrangement of power wires (I/O cell layout), the positions of wires in an I/O cell are already fixed and it is very difficult to add new shield wires. On the other hand, in this embodiment, shield wires are arranged during the I/O cell layout process and therefore wiring design can be remarkably simplified.

Second Embodiment

Figure 8A:
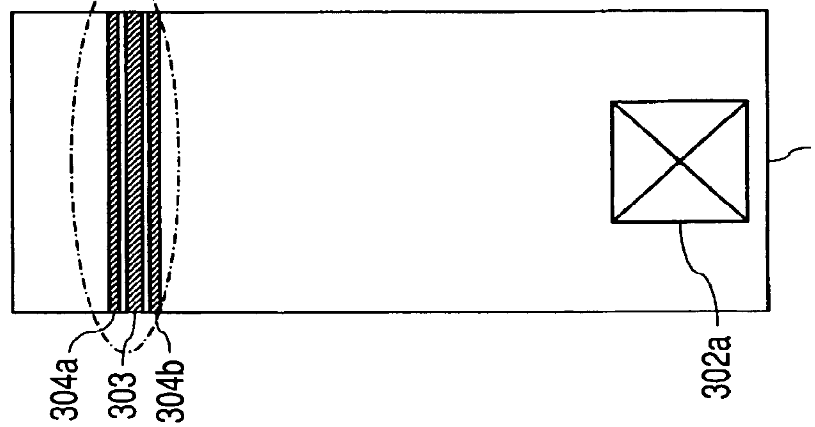
FIGS. 8(*a*) to 8(*c*) show the arrangement of signal wires and shield wires in an I/O cell of a semiconductor device according to a second embodiment of the present invention, in which FIG. 8(*a*) is a top view, FIG. 8(*b*) is a detailed view and FIG. 8(*c*) is a sectional view.
Figure 8B:
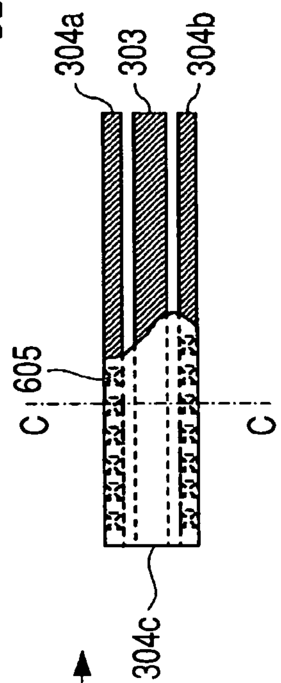
Figure 8C:
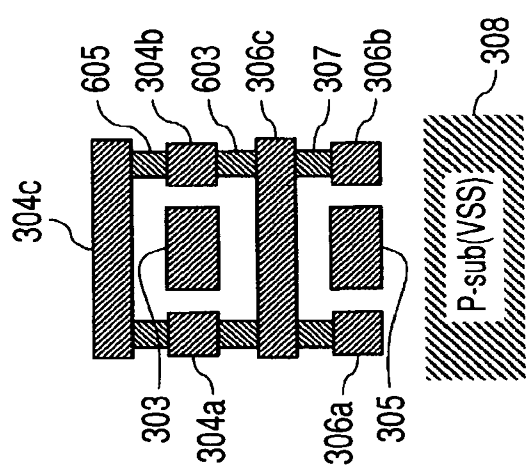

FIGS. 8(*a*) to 8(*c*) show the arrangement of signal wires and shield wires in an I/O cell of a semiconductor device according to a second embodiment of the present invention.

While in the first embodiment a pair of two wires, a true signal wire and a bar signal wire, are formed parallel to each other in the first layer metal, the wiring structure in the second embodiment is different. In the second embodiment, the signal wires are formed in the first layer metal (metal 1) and the third layer metal (metal 3). In other words, the second embodiment employs a multilayered wiring structure in which true and bar signal wires and shield wires are vertically stacked.

The arrangement of shield wires in an I/O cell 301*a* in the second embodiment will be explained below referring to FIGS. 8(*a*) to 8(*c*). FIG. 8(*a*) is a top view of an I/O cell. As shown in FIG. 8(*a*), an I/0 cell 301*a* has a bonding pad 302*a*, a true signal wire 303, shield wires for it, 304*a*, 304*b*, and, under these wires, a bar signal wire 305 and shield wires for it, 306*a*, 306*b*. The true signal wire 303 and shield wires 304*a*, 304*b* are formed in the third layer metal; and the bar signal wire 305 and shield wires 306*a*, 306*b* are formed in the first layer metal.

FIG. 8(*b*) shows details of the true signal wire 303 and the shield wires for it, 304*a* and 304*b*. The shield wires 304*a* and 304*b* are connected to a shield wire 304*c* of the fourth layer metal (metal 4) through third layer via holes (via 3) 605.

FIG. 8(*c*) is a sectional view taken along the line C-C of FIG. 8(*b*). A p-type substrate (P-sub) 308 lies under the bar signal wire 305 and the shield wires for it, 306*a*, 306*b*. The shield wires 306*a*, 306*b* and 306*c* and the first layer via holes 307 and the P-type substrate 308 have the same electric potential (substrate potential VSS). In other words, the bar signal wire 305 is surrounded and shielded by the shield wires 306*a*, 306*b*, 306*c*, the first layer via holes 307 and the p-type substrate 308. Also, the shield wire 306*c* is connected to the shield wires 304*a* and 304*b* of the third layer metal through second layer via holes (via 2) 603. The shield wires 304*a* and 304*b* are connected to the shield wire 304*c* of the fourth layer metal (metal 4) through third layer via holes 605. These wires have the same electric potential (substrate potential VSS). In other words, the true signal wire 303 is surrounded and shielded by the shield wires 304*a*, 304*b*, 304*c*, the second layer via holes 603, the third layer via holes 605 and the shield wire 306*c*.

The positions of the true signal wire 303 and bar signal wire 305 are not limited to those in the second embodiment; they may be interchanged. Furthermore, it is also possible to use three or more signal wires.

Therefore, the semiconductor device according to the second embodiment not only produces the same advantageous effects as in the first embodiment but also offers an additional advantage that the multilayered wiring structure with signal wires and shield wires requires less packaging area than the wiring structure in which signal wires are formed parallel to each other in a layer.

The present invention is particularly useful for LSIs which need long-distance wiring between I/O areas and LSIs with multiple separate power supplies such as those for mobile phones. The reason is as follows. Since a large-scale integrated circuit (LSI) tends to include long-distance wiring for transmission of signals between I/O areas, it is likely to need noise reduction measures such as shielding. In the case of an LSI with multiple separate power supplies, it is likely to need a level shift-up or shift-down process for transmission of signals between I/O areas.

The invention made by the present inventors has been so far explained in reference to preferred embodiments thereof. However, the invention is not limited thereto and it is obvious that these details may be modified in various ways without departing from the spirit and scope of the invention.

Although the above embodiments concern true and bar signals and level shifter circuits, the invention is not limited thereto. The invention is applicable in connection with other types of signals and other types of circuits.

The present invention may be applied to LSIs which need long-distance wiring between I/O areas and LSIs with multiple separate power supplies such as those for mobile phones.

What is claimed is:

1. A semiconductor device comprising:

a core area surrounded by a plurality of I/O areas;

a first one of said plurality of I/O areas configured to receive a first supply voltage;

a second one of said plurality of I/O areas configured to receive a second supply voltage which is lower than the first supply voltage;

a first I/O circuit included in the first one of said plurality of I/O areas;

a second I/O circuit included in the second one of said plurality of I/O areas;

first and second signal wires; and first and second shield wires each running parallel to the first and the second signal wires, wherein the first I/O circuit receives a first and a second signal outputted from the second I/O circuit via the first and the second signal wires, and outputs a level shifted signal from the second supply voltage to the first supply voltage, wherein the second signal is inverted with respect to the first signal, wherein the first and the second signal wires pass over a plurality of I/O cells included in the plurality of I/O areas, and wherein a length of the first signal wire portion which passes over top surfaces of the plurality of I/O cells is equal to a length of the second signal wire portion which passes over the top surfaces of the plurality of I/O cells.

2. The semiconductor device according to claim 1, wherein each of the first shield wire and the second shield wire comprise a plurality of wires having a same electric potential.

3. The semiconductor device according to claim 1, wherein a power wire thicker than the first signal wire lies in a layer over the first signal wire and the second signal wire.

4. The semiconductor device according to claim 1, wherein a semiconductor substrate lies in a layer under the first and the second signal wires, and the first and second shield wires and the semiconductor substrate have a same electric potential.

5. The semiconductor device according to claim 1, wherein a buffer cannot be inserted midway between ends of each of the first and second signal wires.

6. The semiconductor device according to claim 1, wherein the length of each of the first and second signal wires is longer than a length of one edge of a semiconductor chip constituting the semiconductor device.

7. The semiconductor device according to claim 1, wherein the first signal wire and the first shield wire, and the second signal wire and the second shield wire, are multilayered.

8. The semiconductor device according to claim 1, wherein the first I/O circuit comprises a level up shift circuit.

* * * * *